United States Patent [19]
Giese

[11] Patent Number: 5,547,060
[45] Date of Patent: Aug. 20, 1996

[54] PRESSURIZED RADIAL BEARINGS

[75] Inventor: Peter Giese, Herzogenaurach, Germany

[73] Assignee: INA Walzlager Schaeffler KG, Germany

[21] Appl. No.: 288,572

[22] Filed: Aug. 10, 1994

[30] Foreign Application Priority Data

Sep. 21, 1993 [DE] Germany .......................... 43 32 032.5

[51] Int. Cl.[6] ...................................................... F16C 33/46
[52] U.S. Cl. ......................................................... 192/110 B
[58] Field of Search ........................... 192/110 B, 113.5, 192/113.32, 85 AA, 70.12; 384/572, 575, 465, 467, 470, 475

[56] References Cited

U.S. PATENT DOCUMENTS 3,889,626  6/1975  Kakihara ........................ 384/572 X
5,255,985  10/1993  Alling ............................. 384/470 X

*Primary Examiner*—Rodney H. Bonck
*Attorney, Agent, or Firm*—Bierman & Muserlian

[57] ABSTRACT

A radial bearing which can be pressurized by a pressure medium and is arranged between two elements of a load-switchable transmission which rotate at different speeds, a hydraulic pressure medium flowing through the radial bearing causing engagement of a multiplate clutch, and radial sealing rings (10,11) being arranged between the two elements of said transmission in a region of the radial bearing on each side of a pressure medium passage, characterized in that the radial bearing is configured as a rolling bearing whose rolling elements (7,8) are bearing needles guided in a cage (9) which comprises several preferably circumferentially uniformly spaced radial through-apertures (20).

4 Claims, 2 Drawing Sheets

5,547,060

PRESSURIZED RADIAL BEARINGS

STATE OF THE ART

A radial bearing which can be pressurized by a pressure medium and is arranged between two elements of a load-switchable transmission which rotate at different speeds, preferably a shaft and a hollow shaft arranged concentrically therearound, a hydraulic pressure medium flowing through the radial bearing causing engagement of a multiplate clutch, and radial sealing rings being arranged between said two elements of said transmission in a region of the radial bearing on each side of a pressure medium passage is shown in a prospectus of the Zahnradfabrik Friedrichshafen AG (F 43362/RT 3371-683). The pressure medium flowing through the radial bearing pressurizes an annular piston which presses the alternating internal and external geared plates together, thus causing a transmission of force, i.e. an engagement of the clutch. The clutch is disengaged when, on decrease of pressure on the piston, the friction engagement between the plates is released. The disadvantage of this arrangement is that the radial bearing is configured as a sliding bearing and therefore a high degree of friction is involved.

OBJECTS OF THE INVENTION

It is an object of the invention to provide a radial bearing for a load-switchable transmission, which radial bearing can be pressurized by a pressure medium and involves only a small amount of friction while keeping flow-dependent pressure losses within the pressure medium feed system at a low level.

Other objects and advantages of the invention will become obvious from the following detailed description of the invention.

THE INVENTION

The novel radial bearing of the invention which can be pressurized by a pressure medium and is arranged between two elements of a load-switchable transmission which rotate at different speeds, a hydraulic pressure medium flowing through the radial bearing causing engagement of a multi-plate clutch, and radial sealing rings (10,11) being arranged between said two elements of said transmission in a region of the radial bearing on each side of a pressure medium passage, is characterized in that the radial bearing is configured as a rolling bearing whose rolling elements (7,8) are bearing needles guided in a cage (9) which comprises several, preferably circumferentially, uniformly spaced radial through-apertures (20).

The invention achieves this by the fact that the radial bearing is configured as a rolling bearing whose rolling elements are bearing needles guided in a cage which comprises several, preferably circumferentially, uniformly spaced radial through-apertures. The configuration of the radial bearing in the form of a rolling bearing effects a decisive reduction of friction compared to a sliding bearing, and the individual and precise guidance of the bearing needles by the cage makes it possible at the same time to obtain a rolling bearing-mounted assembly with a high bearing capacity and rigidity in the smallest possible radial design space.

The circumferentially, uniformly spaced radial through-apertures of the cage are intended to permit an unobstructed volume flow of the pressure medium through the radial bearing, in other words, to enable a rapid pressure increase and a rapid pressure decrease for respectively engaging and disengaging the clutch. In the absence of such through-apertures, the pressure medium has to make its way through the bearing between the bearing needles and the pockets of the cage, and between the end faces of the cage and the radial sealing rings which results in an increase of flow resistance. The pressure loss thus caused has a detrimental effect on the switching characteristic of the transmission because, due to the diminished volume flow through the bearing, the clutch arranged downstream thereof executes the switching operations with a time lag, i.e. only when the required pressure has been established. Thus, in the absence of this pressure loss-reducing measure, undesired clutch slipping occurs.

According to a further feature of the invention, the through-apertures are cylindrical bores spaced at intervals corresponding to the needle pockets, or they are configured as slots. Through-apertures of such shapes are particularly simple to make with the help of appropriate tools, but their shape is of no significance for the operativeness of the invention. It is conceivable to use through-apertures of any other shape; care must only be taken to assure that their cross-section is sufficiently large enough to permit the passage of the pressure medium.

Figure 1:
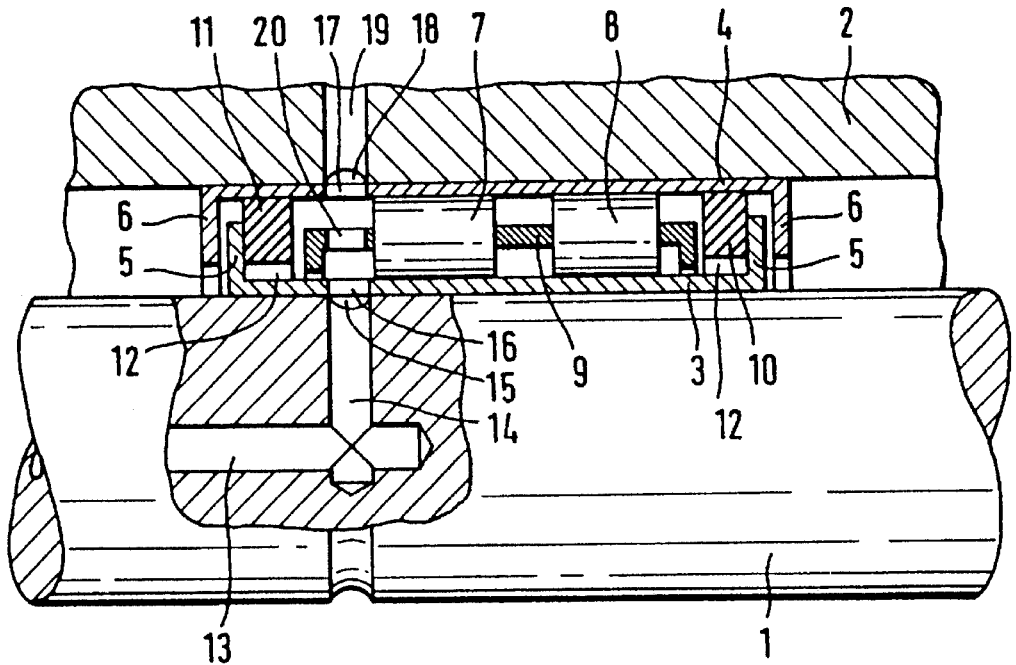
FIG. 1 is a longitudinal cross-section of a rolling bearing which can be pressurized by a pressure medium.

The bearing shown in FIG. 1 which can be pressurized by a pressure medium, can be arranged for example in a load-switchable transmission of a passenger car. A shaft 1 is concentrically surrounded by a hollow shaft 2, only roughly indicated, which communicates via a bore 19 with a multi-plate clutch, not shown. Between the shaft 1 and the hollow shaft 2, which rotate at different speeds, there is arranged a double row needle bearing having an inner ring 3 and an outer ring 4, said inner and outer rings comprising in their outer regions mutually oppositely oriented flanges 5 and 6, respectively. The rolling elements 7 and 8 are guided axially parallel in a cage 9.

On either side of the pressure medium passage, this double-flanged needle bearing is sealed from ambient pressure by a radial sealing ring 10 and 11, respectively. These radial sealing rings 10 and 11 are dimensioned so as to bear closely by their outer peripheral surfaces against the running face of the outer ring 4 and by their front ends against the flanges 5 while, between their inner peripheral surfaces and the running face of the inner ring 3, there remains a gap 12. The pressure built in this gap effects a widening of the radial sealing rings 10 and 11 and thus helps to intensify the sealing action thereof.

Starting from one front end, the shaft 1 is provided with an axial bore 13 into which a radial bore 14 opens which radial bore 14 ends in an annular groove 15 which extends over the entire outer peripheral surface of the shaft 1. Each of the inner ring 3 and the outer ring 4 comprises a transfer bore 16, 17 located respectively opposite the groove 15 and opposite a groove 18 of the bore 19 extending around the hollow shaft 2.

The pressure medium delivered by a pump, not shown, which is at the same time the lubricant for the bearing, passes through the bores 13 and 14, the groove 15 and the bore 16 into the interior of the bearing. Passing then through radial through-apertures 20 arranged along the entire periphery of the cage 9, the pressure medium can leave the interior of the bearing without resistance, i.e. without pressure loss through the bores 17 and 19 and the groove 18, so that the oil pressure required for switching the clutch is available.

Figure 2A:
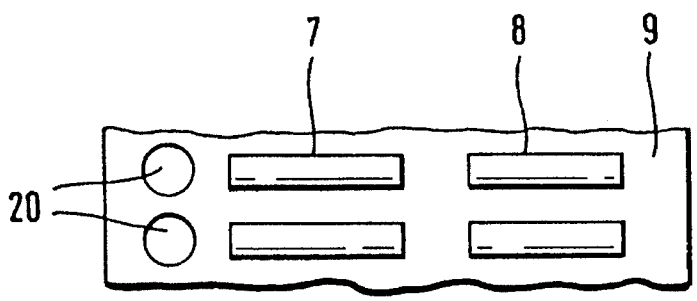
FIGS. 2a and 2b are a top view of a cage having circular and oval through-apertures, respectively.
Figure 2B:
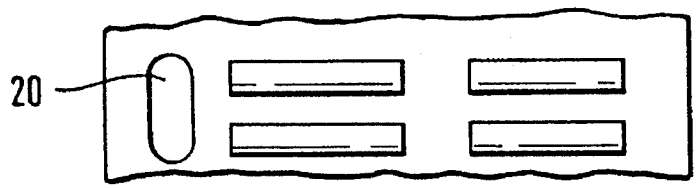

The cage 9 represented in FIG. 2 comprises pockets, not shown, situated adjacent to one another which lodge rolling elements 7 and 8. At its outer left end, the rolling bearing cage 9 comprises radial through-apertures 20 configured as circular bores or as slots. As already mentioned, these radial through-apertures 20 enable an unobstructed passage of the pressure medium through the bearing, thus assuring the oil pressure required for the switching of the clutch.

Figure 3:
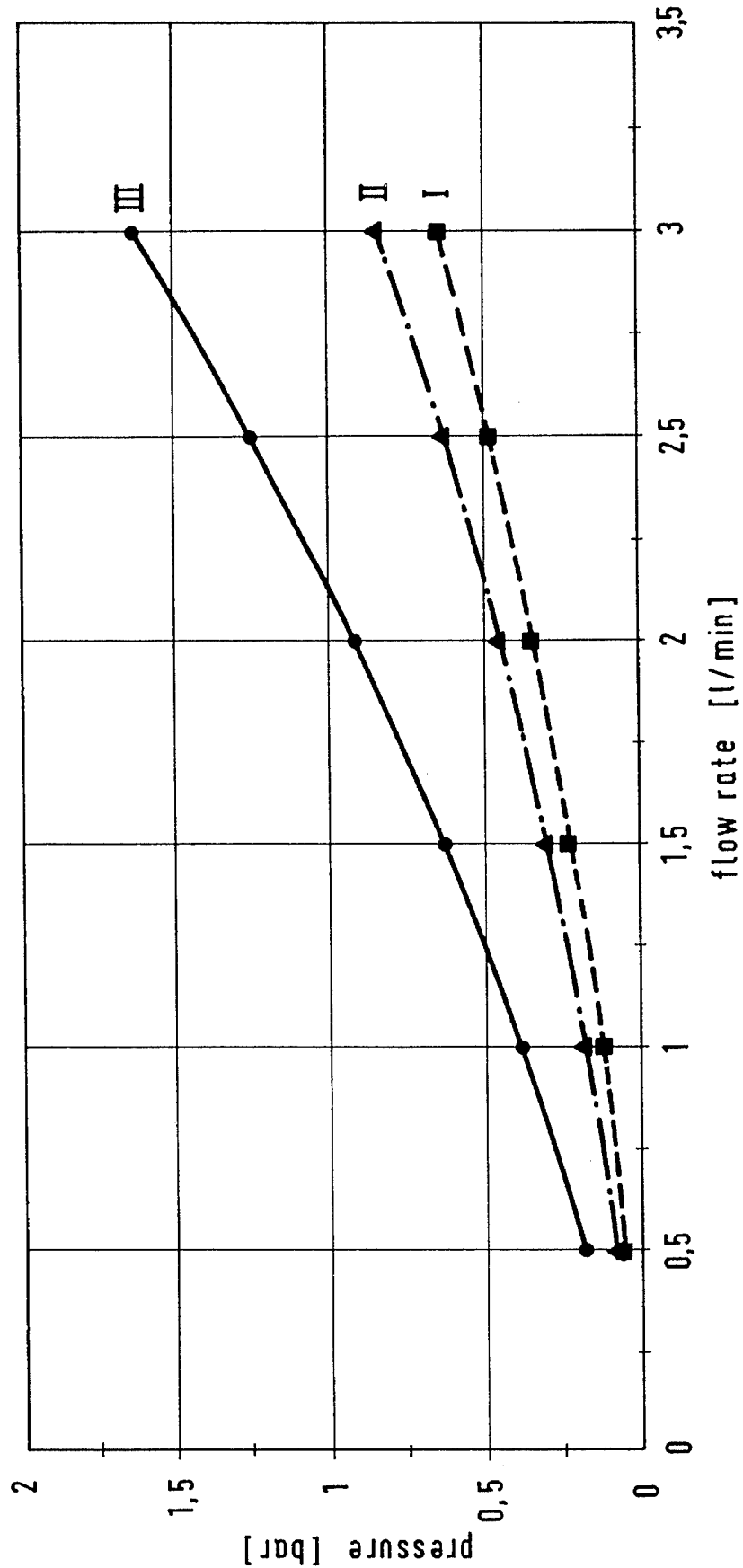
FIG. 3 shows the pressure loss as a function of the flow rate of the pressure medium in different type of bearings.

The curves represented in FIG. 3 show the pressure loss in a pressure medium on its passage through a bearing as a function of the flow rate. Curve I shows the pressure loss in a sliding bearing, Curve II, the pressure loss in a needle bearing having a cage comprising radial through-apertures and Curve III, the pressure loss in a needle bearing whose cage has no through-apertures.

It can be clearly seen that a sliding bearing whose sliding surfaces are covered all around with an oil film by virtue of its construction, suffers the smallest pressure loss. At a rate of flow of 3 1/min, the pressure loss in this case is approximately 0.6 bar. If, in accordance with the invention, the pressurizable radial bearing is configured as a rolling bearing comprising a cage with radial through-apertures, the pressure loss is only slightly higher than in a sliding bearing. As Curve III shows, the pressure loss in a rolling bearing whose cage has no through-apertures can be about three times as high as in a sliding bearing.

Various modifications of the radial bearing of the invention may be made without departing from the spirit or scope thereof and it should be understood that the invention is intended to be limited only as defined in the appended claims.

What is claimed:

1. A radial bearing which can be pressurized by a pressure medium and is arranged between two elements of a load-switchable transmission which rotate at different speeds, a hydraulic pressure medium flowing through the radial bearings for causing engagement of a multiplate clutch, and radial sealing rings (10,11) being arranged between said two elements of said transmission in a region of the radial bearing on each side of a pressure medium passage, characterized in that the radial bearing is configured as a rolling bearing whose rolling elements (7,8) are bearing needles guided in a cage (9) which comprises several circumferentially uniformly spaced radial through-apertures (20).

2. A radial bearing of claim 1 wherein the bearing has arranged concentrically therearound a shaft (1) and a hollow shaft (2).

3. A radial bearing of claim 1 wherein the through-apertures (20) are cylindrical bores spaced at intervals corresponding to pockets lodging said bearing needles.

4. A radial bearing of claim 1 wherein the through-apertures (20) are configured as slots.

* * * * *